3,247,157
STABILIZED CEMENTS OF BUTENE-1 POLYMERS
Thomas G. Reed, Jr., La Porte, and Robert E. Hinkson, Houston, Tex., assignors to Petro-Tex Chemical Corporation, Houston Tex., a corporation of Delaware
No Drawing. Filed Mar. 29, 1963, Ser. No. 269,200
11 Claims. (Cl. 260—33.6)

This invention relates to stabilized poly(butene-1) cements, the preparation and use thereof.

Solvents cementing of articles formed from highly crystalline, isotactic poly(butene-1) has been difficult because the highly crystalline polymers are generally insoluble in most hydrocarbon solvents at room temperatures and a satisfactory bond is difficult to obtain. Recently, certain halogenated solvents have been found to be useful in dissolving highly crystalline poly(butene-1) but have not been effectively utilized in preparing poly(butene-1) cements. While such solvents will dissolve isotactic poly(butene-1) the resulting solutions gel or polymer precipitates therefrom on standing even in short periods of time and heretofore such cements could not be prepared in advance and stored. Prior to this invention cements of isotacitic poly(butene-1) even in halogenated hydrocarbon solvents had to be prepared very dilute just prior to use, and even then the cements gelled and changed in consistency during use at concentrations of poly(butene-1) as low as 3 percent, were difficult to apply and often produced weak and ineffective bonds when cementing poly(butene-1) to itself. This invention provides poly(butene-1) cement of higher concentrations that will not only effectively cement highly isotactic poly(butene-1) type polymers together, but is also stabilized against gelling and precipitation during use so uniform application is obtained and over long periods of time. Such cements thus may be prepared, stored and used as needed. These cements contain poly(butene-1) dissolved in a liquid organic halide and a particular amount of certain hydrocarbons.

The poly(butene-1) used in the composition of this invention is stereoregular isotactic polymer which may be provided by a number of processes which are known to those skilled in the art. Generally, butene-1 is polymerized with the so called Ziegler organometallic type catalysts by a stereospecific polymerization using a variety of catalysts which normally are a combination of compounds of Groups IV through VIII transistion elements in an oxidation state lower than the maximum and metal hydrides or metal alkyls and the like. Such polymerization systems and the catalysts therefor are described in a number of literature sources, including the patent literature, and more comprehensively in such publications as Linear and Stereoregular Addition Polymer, Norman G. Gaylor and Herman F. Mark, 1954, Interscience Publications, Inc., New York, and the article appearing in the Petroleum Refiner, November 1960, Polyolefin Processes Today, Marshall Sittig.

Normally, compounds of metals of Groups IV through VI are employed with compounds of Groups I through III metals. High yields of isotactic poly(butene-1) are obtained with the polyhalides of Groups IV through VI metals, particularly titanium tetrachloride, and the trichloride which may be derived from the tetrachloride, and with alkyl aluminum compounds, including particularly alkyl aluminum halides, such as triethyl aluminum, tributyl aluminum, ethyl aluminum dichloride, diethyl aluminum chloride, ethyl aluminum sesquichloride and the like. The aluminum compound is normally used in molar excess to the titanium compound. The polymerizations may be conducted in bulk, solution, or dispersion, as with an inert hydrocarbon, with an amount of catalyst sufficient to provide the desired conversion to polymer. The amount of catalyst employed is normally from about 0.01 to about five percent of the butene-1 being polymerized. The polymerizations may be conducted, depending upon the particular catalyst system, over a wide range of temperatures, from about 0° C. to about 200° C., but more normally are conducted at temperatures within the range of about 30° C. to about 125° C., and at pressures below about 50 atmospheres. The resulting polymers may be isolated from the reaction medium by precipitation, filtration and the like, and such polymers either before or after precipitation, treated as by washing with water and/or alcohols to remove catalyst residue. The polymers are then dried and packaged.

The particular method employed to prepare isotactic poly(butene-1) is not believed to be critical in accordance with this invention to provide improved and useful compositions so long as the resulting poly(butene-1) has a density above 0.88 (grams/ml. at 25° C.). Another bench mark for characterizing such polymers is by X-ray methods, and these polymers contain more than 20 percent isotactic, stereoregular or crystalline structures by this method. Such polymers may also be characterized as containing more than 50 percent ether insolubles, having densities within the range of about 0.88 to about 0.93, melt indexes from 0.01 to about 5, and tensile yield strengths from about 500 p.s.i. to about 3500 p.s.i. For applications involving molded and extruded goods, particularly pipe, the density is preferably in the range of about 0.9 to about 0.92 with a tensile yield strength above 1000 p.s.i., preferably from about 1500 p.s.i. to about 3000 p.s.i. The melt index of such polymers at 190° F. should be between about 0.01 to 2 for pipe use. The Shore D hardness of such materials will be between about 35 and 75.

The liquid organic halide solvents used to make cements of poly(butene-1) have boiling points from about 80° C. to about 250° C. and vapor pressures below 150 mm. of mercury at standard conditions of 0° C. and 760 mm. of mercury. Very useful cements have been prepared from organic halide solvents having boiling points between about 100° C. to 150° C. at standard conditions. A variety of halogen derivatives of hydrocarbons within the specified boiling point and vapor pressure range have been used to prepare poly(butene-1) cements. The selection of a particular organic halide solvent will depend to some degree upon the particular application and process conditions involved as will be apparent to those skilled in the art. Aromatic halogen-containing solvents such as bromobenzene, trichlorobenzene, trifluorotoluene, and similar halogenated aromatic compounds are not normally satisfactory when used to make poly(butene-1) cements. The poly(butene-1) is soluble in these solvents only at elevated temperatures, and on cooling such solutions the cements gel rapidly. However, in accordance with this invention when the specified amounts of aliphatic hydrocarbons as hexane are added to such cements, stable cements are obtained which remain fluid and free of gel at room temperature for periods of reasonable time and use so that such materials can be used in cements where a halogenated aromatic solvent is desired.

More useful for general application are polyhalogen-containing aliphatic compounds. Ethylenically unsaturated polyhaloaliphatic compounds containing 2 to 4 carbon atoms and at least one chlorine atom, preferably 2 or more, include a preferred group of solvents for the cements of this invention. Such materials include, for example, chlorobromopropane, tetrachloroethylene, tetrachloroethane, trichloroethylene, trichloroethane, and the like. Particularly useful is tetrachloroethylene, and poly(butene-1) cements made with this material and which contain the defined aliphatic hydrocarbon are stable indefinitely and provide excellent bonds when used to adhere poly(butene-1) articles to one another. Mixtures of organic halides may be used including mixtures of organic halides which are solid at room temperature, for example, 25 percent hexachloroethane, dissolved in 75 percent tetrachloroethylene.

The amount of solid polymeric poly(butene-1) used in the cements is an amount of less than 25 to one percent by weight of the total solution. The poly(butene-1) preferably is isotactic and has a density above 0.88 and a weight average molecular weight between about 150,000 to 2,500,000 since the bond strength of the solvent cement is increased as the crystallinity and molecular weight of the dissolved polymer is increased. However poly(butene-1) containing amorphous or low molecular weight polymer may be used to make cements. Although poly(butene-1) in amounts as high as 25 percent by weight of the total solution may be used, isotactic poly(butene-1) in amounts of less than 10 weight percent of the solution is preferred. To obtain a solvent cement possessing an optimum balance of rapid drying and fast tack characteristics and which results in good film resilience and high bond strength, an amount of isotactic, high density poly(butene-1) between about 3 percent to 7 percent by weight of the solution is still further preferred. Resins, fillers such as carbon black, and other compounding ingredients may also be present in the poly(butene-1) or added to the solvent mixture without diminishing or detracting from the useful characteristics of the poly(butene-1) cement.

A cement consisting only of poly(butene-1) polymer and an organic halide solvent has little practical utility because it begins to gel amost immediately after being prepared, it forms an unusable gelatinous mass, is difficult to handle, and does not provide the desired uniform bond for adhering poly(butene-1) pieces together. However, quite unexpectedly, it was found that gelation of the solvent cement could be retarded and in most cases eliminated by the addition to the polymer solution a critical amount of certain aliphatic hydrocarbons. The hydrocarbon additive may be a saturated or unsaturated aliphatic hydrocarbon containing from 4 to 10 carbon atoms. Hydrocarbons containing more than 10 carbon atoms had no apparent stabilizing effect on the solvent cement and hydrocarbon additives containing less than four carbon atoms were unsatisfactory under normal operating conditions. Examples of some of the more useful hydrocarbons that may be used include the saturated hydrocarbons and their respective isomers such as the pentanes, as n-pentane, methylbutane; the hexanes as n-hexane, methylpentane, dimethylbutane; the heptanes as n-heptane, methyl hexane, dimethyl pentane, ethyl pentane, octane, isooctane, nonane, and the like; olefinic and acetylenic hydrocarbons such as 2-methylbutene-2, pentene-1, heptene-2, hexene-1, octene-1, pentyne, hexyne, and the like. Mixtures of the above hydrocarbons may also be advantageously employed not only to stabilize the cement but also to control the cement's viscosity and drying rate. Saturated, preferably, and unsaturated aliphatic hydrocarbons containing 5 to 7 carbon atoms such as pentane, isopentane, 2-methylpentene-2, 3-methylpentene-1, hexane, isohexane, hexene, and the like have given excellent results and are generally preferred. The concentration or amount of hydrocarbon in the cement is critical in the practice of this invention. For example, amounts of hydrocarbon additive below 3 weight percent based on the total weight of the cement show little inhibition of gelation of the cement, while amounts above 25 percent tend to precipitate the polymer from the solvent-polymer mixture. Amounts of hydrocarbon and particularly amounts of pentanes and pentenes of between about 5 percent and 15 percent are the most effective and are preferably used in stabilizing poly(butene-1) cements.

The poly(butene-1) cements are readily prepared by dissolving the poly(butene-1) polymer in the organic halide solvent, normally at an elevated temperature, followed by the addition of a specific amount of saturated or unsaturated hydracorbon additive Standard techniques of preparing cements are well known to those skilled in the art. The cements are useful in bonding poly(butene-1) articles together as in solvent cementing of pipe sections to fittings, cementing films, adhering molded pieces of poly(butene-1) together, and are also useful in cementing other polyolefin materials.

Cements are also made from butene-1 copolymers in accordance with this invention to cement bond articles made of poly(butene-1) or butene-1 copolymers. Such copolymers normally contain a major proportion of butene-1 polymerized with one or more other monomers including, for example, ethylene, propylene, 3-methylbutene-1, butadiene, isoprene, 4-methylpentene-1, styrene, heptene-1, hexene-1, pentene-1; and polymers containing butene-1 with two or more other monomers copolymerized therewith including, for example, butene-1, ethylene, and isoprene; butene-1, ethylene, and propylene; and the like. For example, useful cements are prepared from butene-1 copolymers wherein butene-1 is present in the copolymer in amounts of 90 to 99 weight percent with other copolymerized monomers present in amounts of 1 to 10 percent.

*Example 1*

Fifty grams of poly(butene-1) pellets ⅛″ x ⅛″, having a weight average molecular weight of about 425,000 was placed in a container containing a magnetic stirring bar. The poly(butene-1) had a melt index of 0.5; density of 0.91; tensile yield strength of 1900 p.s.i.; and ultimate tensile strength of 3000 p.s.i 850 grams of tetrachloroethylene was added to the poly(butene-1) polymer in a container equipped with a condenser and the mixture heated to 75° C. with stirring until the polymer was dissolved. The solution was then cooled to room temperature and divided into equal portions. To one-half of the cement, 50 grams of normal pentane was stirred in. The other sample contained no n-pentane. Both samples were transferred to a glass bottle, capped and stored. Periodically a visual inspection was made of the two samples. After only a few hours the sample lacking n-pentane began to thicken, after one day there was visible gel, and after three days the cement had solidified. There was no evidence of gelling in the sample containing the n-pentane. After a period of six months there was no change in consistency of the cement containing n-pentane nor any indication of gelling.

To demonstrate the utility of the stabilized cement, pieces of one-inch diameter poly(butene-1) pipe were joined with injection molded poly(butene-1) fittings with a stabilized poly(butene-1) cement as prepared in Example 1. The cement was applied to the outer surfaces of the poly(butene-1) pipe and the inner surface of the poly(butene-1) fitting, pipe was inserted into either end of the fitting, given a one-half turn to insure complete coating of the mating surfaces, and allowed to dry. After the cemented joints had dried, a series of tests were then run on these units to evaluate the bond strength of the solvent cemented joints. These tests and the results were (1) Pressure surge test: A 50 p.s.i. base pressure was maintained for 5 seconds then increased to 230 p.s.i. and maintained at this level for one second on the units. The pressure was then reduced to 50 p.s.i. and the cycle repeated. There was no failure even after 456 hours. (2) Vibration test: The fitting was held rigidly in clamps and the pipe unit vibrated at 1750 cycles/second through an approximate ⅛ inch amplitude. During the vibration test the pipe was pressured to 250 p.s.i. and maintained at a constant 73° F. temperature. There was no failure after 480 hours. (3) Stress life under pressure: At 250 and 300 pounds internal pressure there was no bond failure after 662 hours and 456 hours, respectively. (4) Quick burst test: This test was designed to determine the ultimate strength of the bonds at 72° F. The ultimate strength of the bond was found to be 480 p.s.i. (5) Flexure tests: There was no indication of bond failure after the pipe units were subjected to a four foot radius flexure. (6) Weather-O-Meter aging studies: After 2000 hours of exposure, the aging studies revealed no substantial loss in tensile property of the bonded areas nor the immediate surrounding pipe area, nor was there any indication of oxidation or ultra-violet deterioration. These properties are more than adequate for pipe applications. Pipe units prepared with a cement not containing n-pentane were difficult to prepare because of the nature of the gelled cement and nonuniform bonds resulted.

*Example 2*

A poly(butene-1) cement was prepared as described in Example 1 with the exception that 2-methylbutene-2 was substituted for the n-pentane. After a storage period of six months, the cement containing 2-methylbutene-2 showed no gel, while a control sample which did not contain 2-methylbutene-2 had begun gelling in less than two hours after it was prepared. Comparative tests and examinations showed that bond strengths of poly(butene-1) cements stabilized with unsaturated $C_5$ hydrocarbons were similar to those of the pipe cemented with the stabilized cement of Example 1.

*Example 3*

Cements were prepared as in Example 1 with the exception that the tetrachloroethylene solvent was replaced with trichlorotoluene in one sample and with bromobenzene in the other. Separate control samples containing polymer and the organic halide solvent were also prepared. The samples containing no hydrocarbon began gelling on cooling and after one hour were solid gelatinous masses, while the samples containing the stabilizing pentane hydrocarbon remained gel free during a use period of two days.

Compositions containing isotactic poly(butene-1) and 25 to 300 weight parts of carbon black per 100 weight parts of poly(butene-1) are used to make valuable extruded or molded articles. Such compositions containing 50 to 150 weight parts of carbon black are useful in forming extruded pipe. Such pipe may be bonded to pipe fittings with a cement made from the same polymer composition containing carbon black, or the cement may be prepared from poly(butene-1) and carbon black added to the cement, in either case excellent bonding of the pipe to fittings is obtained. For example, poly(butene-1) having a density of about 0.91 compounded in an internal mixer with 50 weight parts of a furnace carbon black per 100 weight parts of poly(butene-1) is adequately bonded to injection molded pipe fittings of essentially the same composition when solvent cemented with a cement prepared in accordance with this invention which contains from about 25 to 100 weight parts of carbon black per 100 weight parts of butene polymer in the cement.

We claim:

1. A stabilized polybutene cement comprising a solution of isotactic butene-1 polymer having a density above 0.88 in an organic halide solvent having a boiling point from about 80° C. to about 250° C. and a vapor pressure of below 150 mm. of mercury at standard conditions of 0° C. and 760 mm. of mercury and an aliphatic hydrocarbon for stabilizing said solution against gelation, having 5 to 7 carbon atoms in an amount of between 3 percent to about 25 percent by weight of the total solution, said polymer being present in an amount less than 25 to one percent by weight of said solution and said organic halide solvent being the predominant solvent.

2. A stabilized poly(butene-1) cement comprising a solution of isotactic poly(butene-1) polymer having a density of 0.88 to 0.93 in an organic halide solvent having a boiling point from about 80° C. to about 150° C., a vapor pressure of below 150 mm. of mercury at standard conditions of 0° C. and 760 mm. of mercury, and an aliphatic hydrocarbon for stabilizing said solution against gelation, having from 5 to 7 carbon atoms in an amount between 5 percent and about 15 percent by weight of the total solution, said polymer being present in an amount above one to less than 10 percent by weight of the total cement solution and said organic halide solvent being the predominant solvent.

3. A stabilized poly(butene-1) cement comprising a solution of isotactic poly(butene-1) polymer having a density of 0.88 to 0.93, an organic halide solvent having a boiling point from about 80° C. to about 150° C., and a vapor pressure of below 150 mm. of mercury at standard conditions of 0° C. and 760 mm. of mercury, and an aliphatic hydrocarbon for stabilizing said solution against gelation, having 5 to 7 carbon atoms in an amount of between 5 to about 15 percent by weight of the total solution, said polymer being present in an amount of between 3 to 7 percent by weight of the total cement solution and said organic halide solvent being the predominant solvent.

4. The poly(butene-1) cement of claim 3 wherein the organic halide solvent is tetrachloroethylene.

5. The poly(butene-1) cement of claim 3 wherein the aliphatic hydrocarbon is n-pentane.

6. The poly(butene-1) cement of claim 3 wherein the aliphatic hydrocarbon is 2-methylbutene-2.

7. A method for improving the stability of a cement solution against gelation of an isotactic butene-1 polymer dissolved in an organic halide solvent having a boiling point from about 80° C. to about 250° C. and a vapor pressure of below 150 mm. of mercury at standard conditions of 0° C. and 760 mm. of mercury, which comprises dissolving in said solution between 3 to 25 weight percent based on the weight of the solution of an aliphatic hydrocarbon containing 5 to 7 carbon atoms, said polymer being present in the solution in an amount less than 25 to one percent per weight of said solution and said organic halide solvent being the predominant solvent.

8. In a process for solvent-cementing articles of butene polymers to each other, the improvement which comprises applying to the surfaces to be joined a coating of a solution comprising less than 25 to one weight percent of isotactic butene-1 polymer having a density above 0.88 dissolved in an organic halide solvent having a boiling point from about 80° C. to about 250° C. and a vapor pressure of below 150 mm. of mercury at standard conditions of 0° C. and 760 mm. of mercury and 3 to 25 weight percent based on the weight of the total solution of an aliphatic hydrocarbon containing 5 to 7 carbon atoms, placing the coated surfaces in contact and allowing them to remain in contact until a solid bond is formed, said organic halide solvent being the predominant solvent present in said cement.

9. A stabilized poly(butene-1) cement comprising one to less than 25 weight percent of isotactic poly(butene-1) having a density of between 0.88 and 0.93 and a weight average molecular weight between about 150,000 and 2,500,000 dissolved in tetrachloroethylene and an aliphatic hydrocarbon containing 5 to 7 carbon atoms in an amount between 3 to 25 weight percent based on the total weight of the cement, said tetrachloroethylene being the predominant solvent present.

10. The composition of claim 9 wherein the aliphatic hydrocarbon is pentane.

11. The stabilized poly(butene-1) cement of claim 9 wherein the aliphatic hydrocarbon is 2-methylbutene-2.

References Cited by the Examiner

UNITED STATES PATENTS 2,429,861  10/1947  Woodbridge _____ 260—33.6
2,820,778  1/1958   Spaenig et al. _____ 260—93.7 XR MORRIS LIEBMAN, *Primary Examiner.*